(12) United States Patent
Li et al.

(10) Patent No.: US 11,579,712 B2
(45) Date of Patent: Feb. 14, 2023

(54) DEVICES, SYSTEMS, AND METHODS FOR MULTI-DEVICE INTERACTIONS

(71) Applicant: HUAWEI TECHNOLOGIES CO., LTD., Shenzhen (CN)

(72) Inventors: Wei Li, Richmond Hill (CA); Da-Yuan Huang, Markham (CA); Qiang Xu, Thornhill (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/209,528

(22) Filed: Mar. 23, 2021

(65) Prior Publication Data

US 2022/0308683 A1    Sep. 29, 2022

(51) Int. Cl.
| | |
|---|---|
| G06F 3/0354 | (2013.01) |
| G06F 3/01 | (2006.01) |
| G06F 3/0346 | (2013.01) |

(52) U.S. Cl.
CPC .......... *G06F 3/03543* (2013.01); *G06F 3/016* (2013.01); *G06F 3/0346* (2013.01); *G06F 2203/0384* (2013.01)

(58) Field of Classification Search
CPC .... G06F 3/03543; G06F 3/016; G06F 3/0346; G06F 2203/0384
See application file for complete search history.

(56) References Cited

U.S. PATENT DOCUMENTS

| | | | |
|---|---|---|---|
| 5,926,168 A * | 7/1999 | Fan | G06F 3/0325 345/158 |
| 10,620,721 B2 | 4/2020 | Goldberg et al. | |
| 2004/0017359 A1* | 1/2004 | Bohn | G06F 3/038 345/163 |
| 2004/0215815 A1* | 10/2004 | Rekimoto | H04L 67/14 709/236 |
| 2005/0052418 A1* | 3/2005 | Khajavi | G06F 3/03543 345/163 |
| 2005/0078087 A1* | 4/2005 | Gates | G06F 3/03543 345/163 |

(Continued)

OTHER PUBLICATIONS

Brudy, Frederik et al., "Cross-Device Taxonomy: Survey, Opportunities and Challenges of Interactions Spanning Across Multiple Devices," CHI 2019, May 4-9, 2019, Glasgow, Scotland, UK, pp. 1 28.

(Continued)

*Primary Examiner* — Ariel A Balaoing

(57) ABSTRACT

There is provided a pointing device including a mode switching apparatus that switches the pointing device between a two-dimensional (2D) operational mode and a three-dimensional (3D) operational mode and a sensor configured to determine a pointing direction of the pointing device and locations of a plurality of computing devices. When in the 2D operational mode, the pointing device is paired with a first computing device of the plurality of computing devices and controls the first computing device and when in the 3D operational mode, the pointing device is configured to select a second computing device of the plurality of computing devices additionally to control, the selection based on one or more of the pointing direction of the pointing device and the location of the second computing device.

20 Claims, 9 Drawing Sheets

(56) References Cited

U.S. PATENT DOCUMENTS

| | | | |
|---|---|---|---|
| 2005/0170778 A1* | 8/2005 | Uchiyama | G06F 3/038 455/41.2 |
| 2006/0238509 A1 | 10/2006 | Adler | |
| 2007/0293261 A1* | 12/2007 | Chung | G06F 3/03543 455/550.1 |
| 2008/0122787 A1 | 5/2008 | Huang et al. | |
| 2009/0102791 A1 | 4/2009 | Mote | |
| 2009/0167679 A1 | 7/2009 | Klier et al. | |
| 2011/0304557 A1 | 12/2011 | Wilburn et al. | |
| 2012/0127012 A1* | 5/2012 | Gicklhorn | H04N 21/42204 341/176 |
| 2013/0267172 A1* | 10/2013 | Ko | H04L 67/2804 455/41.1 |
| 2014/0267109 A1* | 9/2014 | Lin | G06F 3/0346 345/173 |
| 2016/0320934 A1* | 11/2016 | Thomason | G06F 3/0481 |
| 2017/0041072 A1* | 2/2017 | Rong | H04W 76/15 |
| 2017/0162036 A1* | 6/2017 | Agardh | G08C 17/02 |
| 2017/0249024 A1* | 8/2017 | Jackson | G06F 3/038 |
| 2018/0151060 A1* | 5/2018 | Griffin | H04N 21/414 |

OTHER PUBLICATIONS

Witrisal, K. et al., "High-accuracy positioning for indoor applications: RFID, UWB, 5G, and beyond," 2016 IEEE International Conference on RFID (RFID), May 2016, pp. 1-7.

Rekimoto, Jun. "Pick- and-drop: a direct manipulation technique for multiple computer environments," Proceedings of the 10th annual ACM symposium on User interface software and technology, 1997, total 9 pages.

Wilson, Andrew et al., "XWand: UI for intelligent spaces," Proceedings of the SIGCHI conference on Human factors in computing systems (CHI 2003), Apr. 5-10, 2003, Ft. Lauderdale, Florida, USA, total 8 pages.

Saïdi, Houssem Eddine et al., "TDome: A Touch-Enabled 6DOF Interactive Device for Multi-Display Environments," ACM CHI 2017 Conference on Human Factors in Computing Systems (CHI 2017), May 6, 2017-May 11, 2017 (Denver, United States), total 14 pages.

"Logitech Flow Multi-Device Control and Easy File Sharing," Web page <https://www.logitech.com/en-gb/product/options/page/flow-multi-device-control>. 7 pages, Apr. 21, 2020, retrieved from Internet Archive Wayback Machine <https://web.archive.org/web/20200421085239/https://www.logitech.com/en-gb/product/options/page/flow-multi-device-control> on Dec. 21, 2021.

* cited by examiner

DEVICES, SYSTEMS, AND METHODS FOR MULTI-DEVICE INTERACTIONS

FIELD

The present disclosure pertains to user interfaces for electronic devices, and in particular to a method, system, and devices for controlling a plurality of electronic devices.

BACKGROUND

The use of pointing devices to control a computer and other electronic devices, hereafter referred to as computing devices, is well known in the art. Examples include computer mice, track balls, track pads, remote controls, keypads, terminal programs, touch screens, etc. Examples of computing devices include laptop and desktop computers, tablets, smart phones, televisions, and various networked smart audio/visual (A/V) devices.

Presently, in many commercial and residential environments there are a number of computing devices with each computing device having its own dedicated pointing device or devices. This may be an environment with one or more networked televisions, multiple computers, multiple smartphones, A/V receivers, and audio speakers and the like. A worker may use a desktop computer to write a document while browsing additional materials on a laptop. The worker may present the report by moving it to a public display (e.g., a smart TV or a projector). Similar scenarios exist with multi-display interactions and multi-device interactions.

This leads to challenges in designing an effective user interface.

Some solutions use the paradigm of virtually arranging computing devices side by side so that a pointing device can be used to select devices and transfer files in a similar manner to using multiple computer monitors as is known in the art. However, this type of solution does not scale as the number of devices increases.

Other solutions allow the use of a stylus to perform "pick-and-drop," where a user selects a file on screen A with the stylus and transfers the file to another device by placing the stylus on screen B. However, this design requires physical contact between the stylus and the devices, making distant file transfer inconvenient and less efficient.

Other solutions include spatial interactions, where a user can point a controller at a computing device and start controlling the device. The user can target, select, or move files between the displays by rotating, rolling, or translating. Spatial interactions are efficient for target selection, as the user completes the interaction with intuitive pointing and 3D motions. However, in an environment where devices are physically close, the pointing mechanisms are prone to mis-selection. Also, since the pointing mechanisms do not consider the distance of the devices from the controller, devices on the same line of sight may be difficult to accurately distinguish between leading to further errors.

Therefore, there is a need for a method and apparatus for a pointing device to control multiple computing devices that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments is to provide a method and apparatus for a pointing device to select, control, and transfer files and digital media between multiple computing devices. The pointing device may switch between a two-dimensional (2D) operational mode and a three-dimensional (3D) operational mode depending on how it is being used.

In accordance with exemplary embodiments, there is provided a pointing device including a mode switching apparatus that switches the pointing device between a two-dimensional (2D) operational mode and a three-dimensional (3D) operational mode and a sensor configured to determine a pointing direction of the pointing device and locations of a plurality of computing devices. When in the 2D operational mode, the pointing device is paired with a first computing device of the plurality of computing devices and controls the first computing device and when in the 3D operational mode, the pointing device is configured to select a second computing device of the plurality of computing devices additionally to control, the selection based on one or more of the pointing direction of the pointing device and the location of the second computing device.

The examples disclosed herein provide the technical benefit of a universal pointing device that allows for the control of a plurality of computing devices. As such a single pointing device can provide both traditional control of a computing device and further enables the selection of a different computing device that is to be controlled. Further, a single device is able to initiate actions between the first computer and the second computer, for example file transfer, thereby reducing the necessity of multiple controllers or pointing devices.

In further exemplary embodiments, the mode switching apparatus includes a proximity sensor configured to detect a distance between the pointing device and a supporting surface of the pointing device. This provides the technical benefit of using an intuitive way of switching between 2-D and 3-D operational modes.

In further exemplary embodiments, the mode switching apparatus is configured as a button, a switch, a toggle or a pressure sensor.

In further exemplary embodiments, when the distance is greater than a predetermined threshold, the mode switching apparatus is configured to switch the pointing device to the 3D operational mode or maintain the pointing device in the 3D operational mode. In further exemplary embodiments, when the distance is less than a predetermined threshold, the mode switching apparatus is configured to switch the point device to the 2D operational mode or maintain the pointing device in 2D operational mode.

In further exemplary embodiments, controlling the paired computing device includes selecting a file for copying to another computing device.

In further exemplary embodiments, the sensor module includes an ultra-wideband (UWB) communications module. In some embodiments, the UWB communications module is configured to receive location information from the plurality of computing devices. In some embodiments, the location information is indicative of a relative direction and distance between the pointing device and the plurality of computing devices. This provides the technical benefit of utilizing a communications module for the multiple purposes of communications and location determination, saving power and cost of the pointing device.

In further exemplary embodiments, the pointing device further includes a haptic actuator configured to provide haptic feedback to a user.

In accordance with exemplary embodiments, there is provided a method of controlling a plurality of computing devices. The method includes obtaining, by a sensor of a pointing device, a pointing direction of the pointing device and locations of the plurality of computing devices. The method further includes controlling, by the pointing device, a paired computing device of the plurality of computing devices while the pointing device is in a two-dimensional (2D) operational mode. Upon transfer into a three-dimensional (3D) operational mode, the method further includes additionally selecting, by the pointing device, a target computing device of the plurality of computing devices, the selecting based on an input at least in part received from a sensor.

In further exemplary embodiments, the sensor module determines a relative position between the pointing device and the target computing device and a pointing direction of the pointing device.

In further exemplary embodiments, the pointing device switches into the 3D operational mode upon determination that a distance between the pointing device and a supporting surface of the pointing device is greater than a predetermined threshold. In further exemplary embodiments, the pointing device switches into the 3D operational mode upon activation of a mode switching control.

In further exemplary embodiments, the target computing device is selected upon detection that the pointing device is within a predetermined distance of the target computing device. In further exemplary embodiments, the target computing device is selected upon detection that the pointing device is pointing at the target computing device.

In further exemplary embodiments, the pointing device uses a ultrawide band (UWB) communication module to determine the pointing direction of the pointing device.

In further exemplary embodiments, the target computing device is one of a plurality of computing devices pointed at by the pointing device. The method further includes detecting, by the pointing device, repeated activation of a mode switching apparatus, thereby selecting the target device from the plurality of computing devices.

In further exemplary embodiments, the method further includes determining, by the pointing device, a file type of the file, determining, by the pointing device, that the file type is compatible with the target computing device and completing, by the pointing device, the copying of the file from the paired computing device to the target computing device. This provides the technical benefit of only transferring files to computing devices that may make use of the file.

In accordance with exemplary embodiments, there is provided a non-transitory storage medium storing thereon machine executable instructions. The machine executable instruction, which when executed by a processor cause a pointing device to perform the steps obtaining, by a sensor of a pointing device, a pointing direction of the pointing device and locations of the plurality of computing devices and controlling, by the pointing device, a paired computing device of the plurality of computing devices while the pointing device is in a two-dimensional (2D) operational mode. Upon transfer into a three-dimensional (3D) operational mode, the machine executable instructions, which when executed by the processor further cause the pointing device to perform the step of additionally selecting, by the pointing device, a target computing device of the plurality of computing devices, the selecting based on an input at least in part received from a sensor.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

It has been realized that there are several challenges in designing an effective user interface. For example, what is the "mouse" or pointing device for association with an integrated multi-device system? How can files be transferred between the devices efficiently? How can files of different formats and digital content (stream, image, text, etc.) be transferred between different computing devices in a 3D physical space.

Embodiments of the present disclosure relate a pointing device to select, control, and transfer files and digital media between multiple computing devices. The pointing device supports two operational modes of use. A first mode is a two-dimensional (2D) operational mode which is similar to a traditional computer mouse where the mouse is placed on a flat supporting surface and manipulates a cursor on a computer screen to control the computer. A second mode is a three-dimensional (3D) operational mode, where the pointing device may be held in a user's hand, moved and pointed in 3D space, and used to control a plurality of computing devices in an environment.

Figure 1:
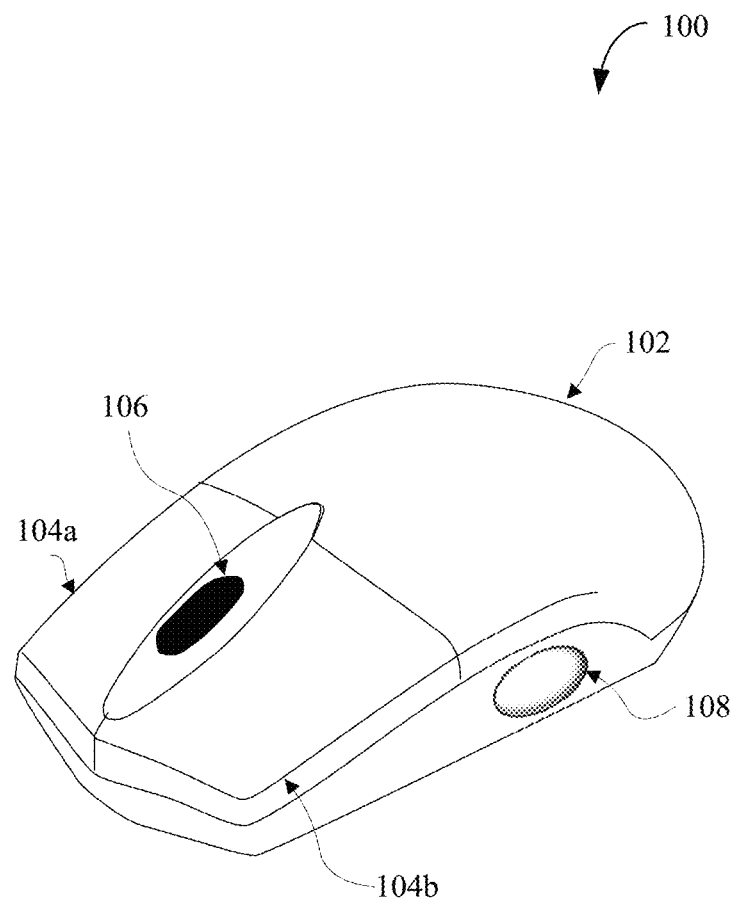
FIG. 1 illustrates a pointing device featuring a mode switching apparatus, according to an embodiment.

FIG. 1 illustrates a pointing device 100 featuring a mode switching apparatus 108, according to an embodiment.

While the mode switching apparatus 108 is configured and illustrated as a button in FIG. 1, it would be readily understood that the mode switching apparatus 108 can take on other configurations including a switch, toggle, pressure sensor or other mechanism or sensor that is capable of detecting a desired action. In this embodiment the pointing device 100 has the shape of a traditional computer mouse. The pointing device 100 has a housing 102 and includes two buttons 104a and 104b. The pointing device 100 also includes a scroll wheel 106. A mode switching apparatus 108 is placed on one side of the pointing device 100 and may be used to toggle the pointing device between a 2D operational mode and a 3D operational mode. The pointing device may be wireless or wired. In the case of a wired device, the wired connection (not shown) may be used to connect the pointing device 100 to a computing device for control purposes or for charging an internal battery of the pointing device 100.

In embodiments, the pointing device 100 may have a number of shapes and sizes similar to the wide variety of computer mice, track balls, track pads, remote controls, etc. Features of these pointing devices may also be combined. For example, a mouse may include a surface that acts as a track pad, a track pad may include a track ball or a keypad, etc. The pointing device may also be shaped so that it sits flat on a surface when used in a 2D operational mode while being easy to grasp, hold, and point when used in a 3D operational mode. The housing 102 of the pointing device 100 may include a protruding or pointing portion to make it easier for a user to gage the direction that it is pointed in and may also include a laser pointer to indicate the direction it is pointed in. In embodiments the pointing device may include only a single button, two buttons such as 104a and 104b in FIG. 1, or more. Buttons can be used to select graphical elements on a computing device's graphical user interface (GUI) such as files, buttons, sliders, checkboxes, etc. Buttons may be placed on any portion of the pointing device 100 and the pointing device itself may also act as a button when pushed down. The buttons 104a and 104b may be used to implement commonly used graphic user interface (GUI) functions such as "right-click", "left-click", "click-and-hold", etc. The scroll wheel 106 may be used to scroll the viewing pane of a graphical display up, down, left, or right. The scroll wheel 106 may have a wheel shape for scrolling up and down. The scroll wheel 106 may be able to tilt left and right to implement horizontal scrolling of a GUI. The scroll wheel 106 may be implemented as a ball or a capacitive surface to implement scrolling of a GUI in multiple directions. The mode switching apparatus 108 (e.g. button) may be placed on any convenient location of pointing device 100 and may be a mechanical button, capacitive or resistive touch surface, force sensors placed at the sides of housing 102, and may be implemented as a single button or a combination of buttons, or may be activated when activated simultaneously with an additional user interface device such as a separate keyboard.

Figure 2:
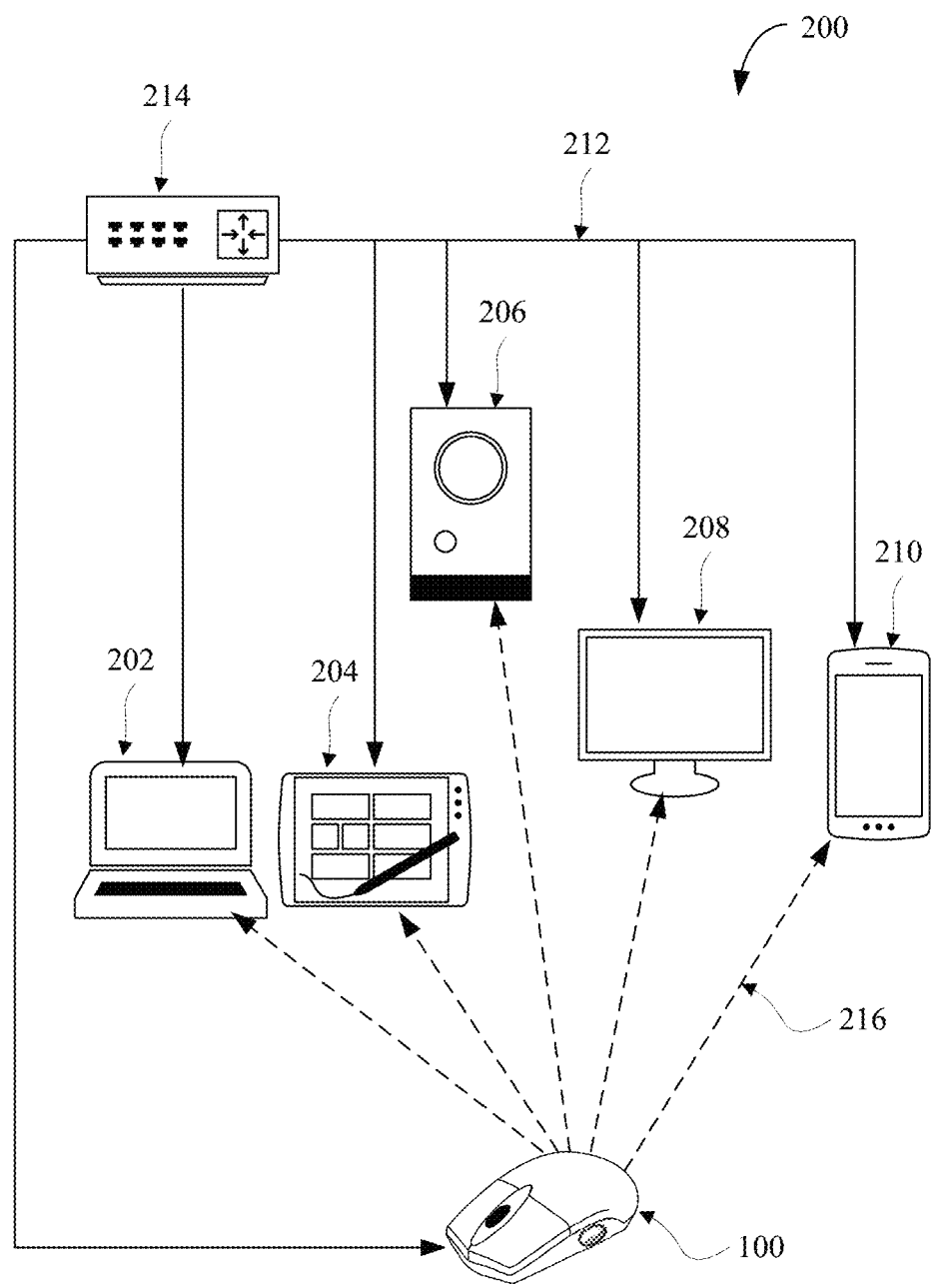
FIG. 2 illustrates a pointing device capable of operating with a number of computing devices, according to an embodiment.

FIG. 2 illustrates a pointing device 100 capable of operating with a system of computing devices 200, according to an embodiment. Any number of computing devices may be included in the system. Each computing device includes the necessary computer hardware to communicate using one or more wireless or wired networks as is necessary for them to be controlled and have files transferred to them or from them. The non-exhaustive list of computing devices may include a computer 202, a tablet 204, an audio speaker 206, a television 208, and a smartphone 210. The computer 202 may be a laptop or desktop computer including a processor, memory, and wired or wireless communication interfaces such as Ethernet, WiFi, Bluetooth, etc. The computer 202 stores and may utilize any number of digital files such as word processing files, spreadsheets, HTML files, audio files, video files, etc. The computer 202 is typically controlled using a computer mouse, a trackpad, or a touch screen, and includes a keyboard. The tablet 204 is similar to a computer 202 but typically has a GUI based on a touch screen interface. The speaker 206 has a primary function of playing audio files and includes computing electronics to connect to a network such as a wireless Bluetooth network in order to receive digital audio files for playback. The audio speaker portion and the computing electronic portion of the speaker 206 may be included in the same or different housings. The television 208 includes a screen for displaying digital video files, speakers, and wired and wireless communications hardware to communicate with local devices and the Internet. The television 208 is typically controlled through a remote control. The smartphone 210 is similar to and a smaller version of the tablet 204 with the addition of cellular communications hardware, software, firmware and is typically controlled using a touch screen GUI. It is understood that there is overlap between the different functions of the computing devices of system 200. For example, most of the computing devices illustrated include an audio speaker and several of the communications interfaces supported by the computing devices will be common to several of the computing devices illustrated.

The communications network 212 includes one or more wired or wireless communications networks that allow the computing devices of the system 200 to communicate with each other. In some embodiments, this includes a network device 214 which may be a router, gateway, access point, switch, hub, repeater, or other network device as required. The communications network 212 may be multiple networks. For example, the computer 202 may support wired Ethernet, wireless WiFi, Bluetooth, and UWB interfaces. The speaker 206 may only support Bluetooth. The smartphone 210 may support cellular data, WiFi, and Bluetooth. The system includes networking hardware to bridge different communications protocols to implement a seamless network.

The pointing device 100 may be used to control any or all of the computing devices in the system 200. The pointing device 100 includes a number of communications interfaces to allow it to communicate with any of the computing devices of the system 200.

Figure 3:
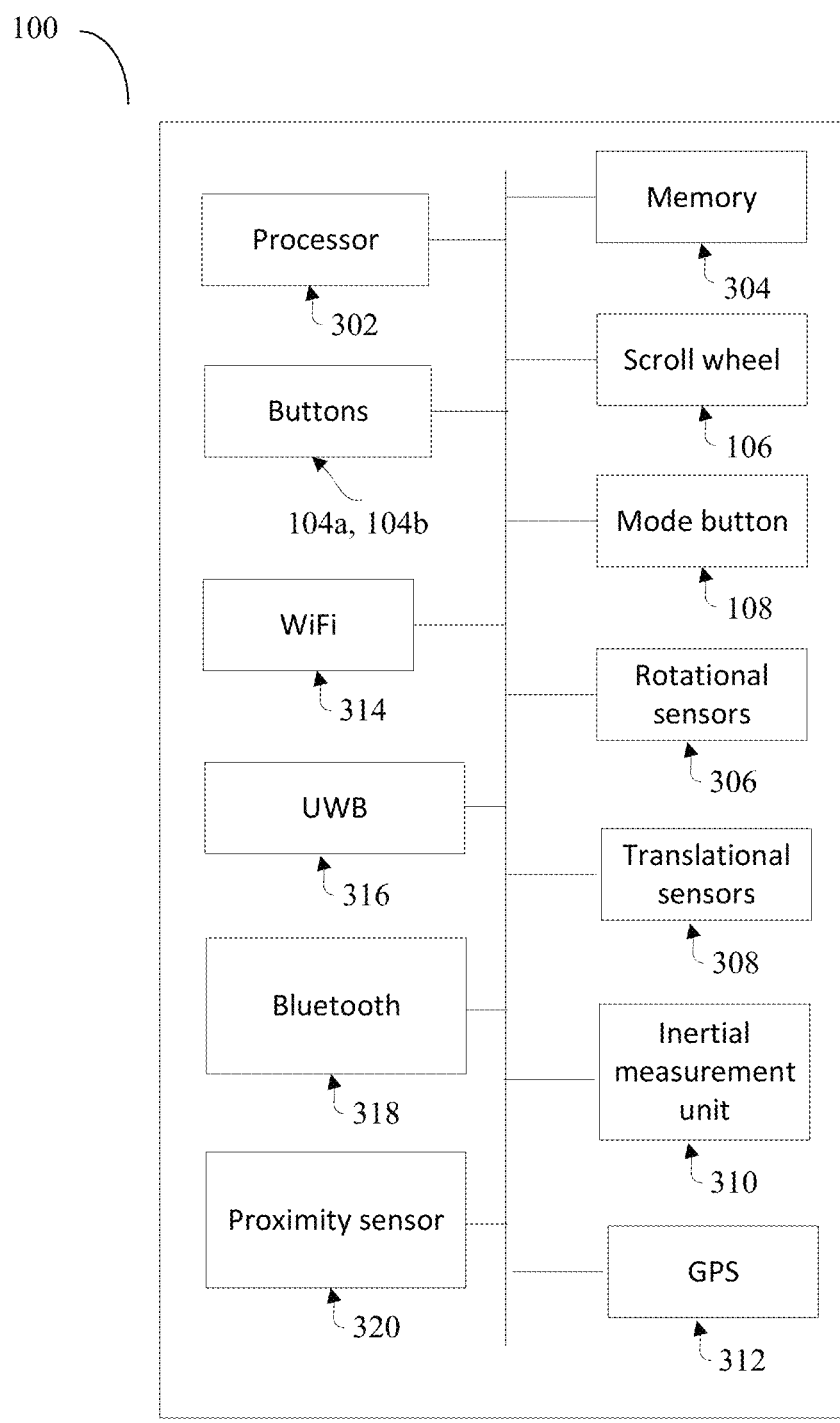
FIG. 3 illustrates a block diagram of a pointing device with internal functional modules, according to an embodiment.

FIG. 3 illustrates a block diagram of a pointing device 100 that may perform any or all of operations of the methods and features explicitly or implicitly described herein, according to different embodiments. As shown, the pointing device 100 may include a processor 302, such as a central processing unit (CPU), a memory 304, which may include a non-transitory mass storage to store computer instructions and configuration parameters, and other modules with all the illustrated functional blocks communicatively coupled via a bus. The internal modules may be viewed as falling into different categories such as a user-interface modules, positional modules, and communications modules. The user-interface modules can include buttons 104a and 104b, a scroll wheel 106, and a mode switching apparatus 108. The positional modules can include rotational sensors 306, translational sensors 308, an inertial measurement unit 310, a global positioning system (GPS) module 312, and a proximity sensor 320.

When in 3D operational mode, the pointing device 100 may sense six degrees of freedom (6 DoF). The degrees of freedom (DoF) refer to the number of ways an object can move through three-dimensional space. There are six total degrees of freedom which describe possible movement of an object. Three for rotational movement around the x, y, and z axes (also known as pitch, yaw, and roll) are sensed by the rotational sensors 306. Three translational sensors 308 are provided for translational movement along those axes (i.e. x, y and z axes), which can be thought of as moving forward or backward, left or right, and up or down.

The GPS module 312 provides location information of the pointing device 100 with respect to a terrestrial location. The GPS module 312 receives signals from satellite networks such as the GPS satellite network, global navigation satellite system (GLONASS), BeiDou navigation satellite system (BDS), etc. The GPS module 312 may provide a location to within 6-10 m though it requires a line of site to satellites in order to be accurate. The inertial measurement unit (IMU) 310 includes any number of other location or positional sensors such as accelerometers, gyroscopes, magnetometers, etc. to measure acceleration, rotational rate, or a heading of the pointing device 100. The IMU 310 may contain separate sensors for each of the three axes; pitch, roll, and yaw. The pointing device 100 may also contain a proximity sensor 320 to determine the distance between the pointing device 100 and a surface. The proximity sensor reading may be used to determine when the pointing device 100 is in a 2D operational mode or a 3D operational mode based on how close the pointing device is to a particular computing device of the system 200. The proximity sensor 320 may be paired with a haptic feedback device to provide feedback during operation of the pointing device 100 to indicate selection of a computing device, selection of files, dropping of files, etc.

The communication modules include hardware, firmware, and software support for communications protocols such as WiFi 314, UWB 316, and Bluetooth 318, etc. WiFi refers to a family of wireless networking protocols based on the IEEE 802.11 family of standards. WiFi modules may use multiple-input multiple-output (MIMO) technology that allows for multiple transmit and receive antennas. The multiple paths between a MIMO transmitter and a MIMO receiver can allow for the estimation of the relative location and distance of a device, for example by calculating the angle of arrival (AoA) or time of flight (ToF) of received signals. UWB is a radio technology for low energy, short range, and high bandwidth communications that may also be used for substantially precise locating of devices using this technology. UWB location detection may use techniques such as measuring received signal strength (RSS), AoA, time of arrival (ToA), time difference of arrival (TDoA), etc. to determine the relative direction and distance between two devices. UWB location techniques may be used to determine the location of devices to within 10 cm. Bluetooth, including Bluetooth Low Energy (BLE) may be used to determine the distance between two devices. One method to use Bluetooth to determine a distance is by measuring the RSS and this technique can be accurate over a range of about 1 to 5 m. The pointing device 100 and the computing devices of the system 200 implementing communications protocols that allow for the calculation of the location, direction, or distance between devices may be used in embodiments to determine if the pointing device 100 is pointed at a particular computing device or multiple computing devices.

According to certain embodiments, one or more of the depicted elements may be utilized, or only a subset of the elements may be utilized. Furthermore, the pointing device 100 may contain multiple instances of certain elements, such as multiple processors, memories, or modules. Also, elements of the hardware devices may be directly coupled to other elements without the bus. Additionally, alternatively to a processor and memory, other electronics, such as integrated circuits, may be employed for performing the required logical operations.

The memory 304 may include any type of non-transitory memory such as static random access memory (SRAM), dynamic random access memory (DRAM), synchronous DRAM (SDRAM), read-only memory (ROM), any combination of such, or the like. The memory 304 may also include a mass storage element such as any type of non-transitory storage device, such as a solid state drive, hard disk drive, a magnetic disk drive, an optical disk drive, USB drive, or any computer program product configured to store data and machine executable program code. According to certain embodiments, the memory 304 may have recorded thereon statements and instructions executable by the processor 302 for performing one or more of the aforementioned method operations described herein.

Figure 4:
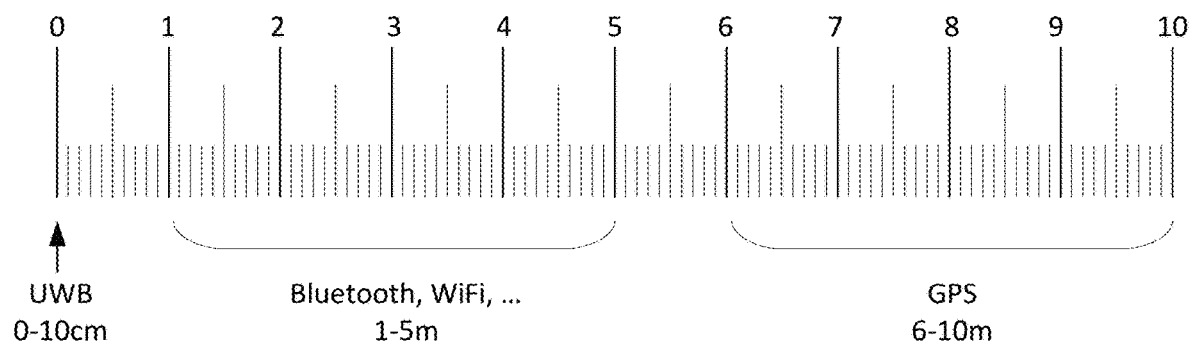
FIG. 4 illustrates effective resolution of wireless communication systems that may be used by a pointing device to determine the locations of devices, according to an embodiment.
Figure 4:
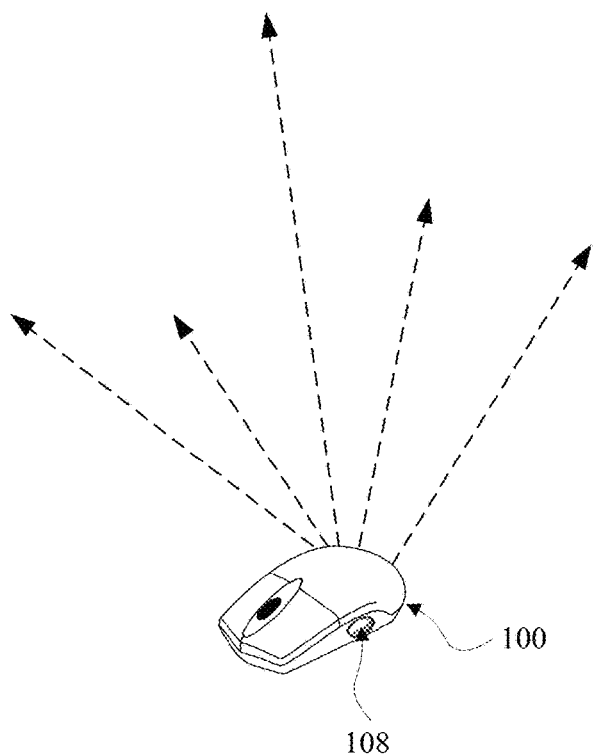

FIG. 4 illustrates effective resolutions of wireless communication systems that may be used by a pointing device to determine the locations of devices according to an embodiment. The pointing device 100 includes one or more communications modules that may be used to determine the absolute or relative location of the computing devices of the system 200. Different communications systems are capable of determining the location of other devices with a given accuracy. The GPS module 312 may be used to determine an absolute location of the pointing device 100. The computing devices of the system 200, if equipped with a GPS module, may also determine and provide an absolute location. GPS modules in consumer electronics are typically accurate to 6 m to 10 m and require a line of site to satellites. The WiFi module 314 and the Bluetooth module 318 may be used to determine a relative location between the pointing device 100 and the computing devices of the system 200 with an accuracy between 1 m and 5 m depending on the particular version of the WiFi and Bluetooth standards, and the software and hardware implementation. The UWB module 316 may be used with an accuracy better than 10 cm. Locations may be determined using one or many methods described herein. Location information from the pointing device 100 and computing devices may be combined to produce more accurate results. Location data from the communications modules may be combined with data from positional modules including rotational sensors 306, translational sensors 308, the inertial measurement unit 310, the GPS module 312, and the proximity sensor 320.

Figure 5:
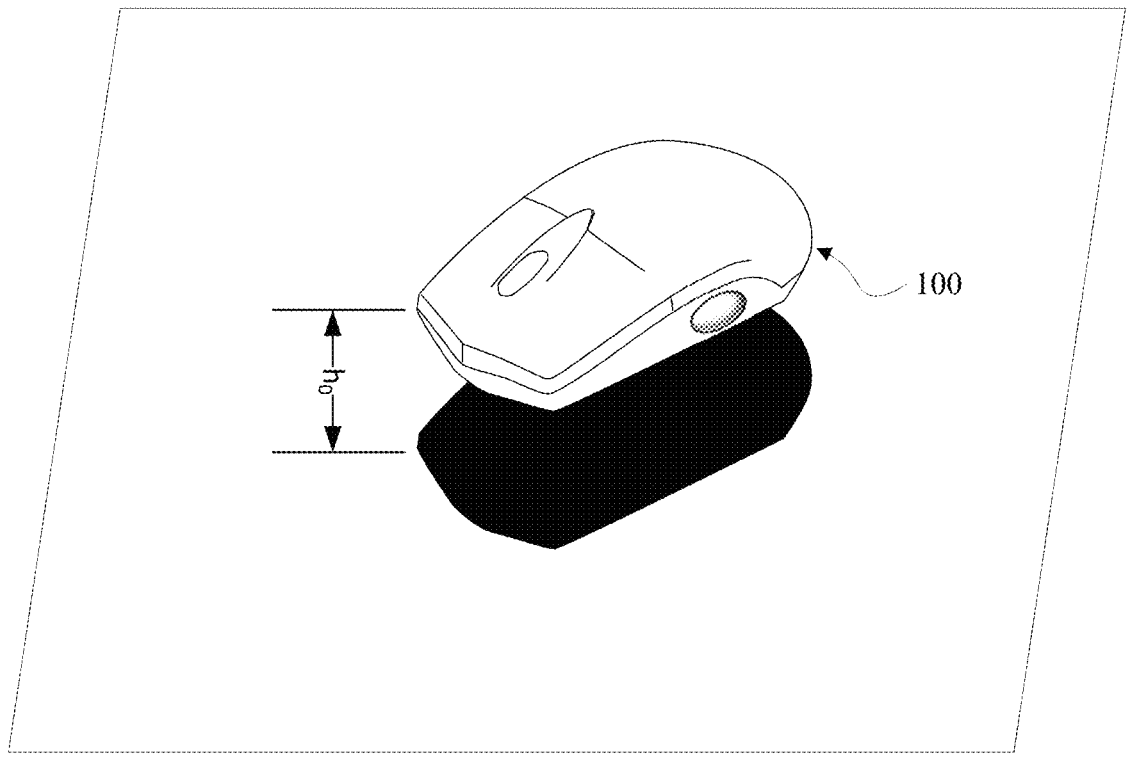
FIG. 5 illustrates the use of a proximity sensor to determine the height or position of a pointing device relative to a surface, according to an embodiment.

FIG. 5 illustrates the use of a proximity sensor to determine the height of a pointing device over a flat surface, according to an embodiment. The pointing device 100 may be used as a conventional 2D pointing device paired with a computing device, such as a computer mouse used to control a single computing device or may be used as a 3D pointing device to control a system 200 of computing devices including interactions, such as file transfers, between devices. Embodiments include methods to switch between these 2D and 3D operational modes which may be based on a number of actions. One action is to use the proximity sensor 320 in the pointing device 100 and may be used to switch between 2D and 3D operational modes. If the proximity sensor detects that the distance between the pointing device 100 and a supporting surface, such as a table surface, is less than $h_0$, the pointing device 100 can be in 2D operational mode. If the proximity sensor detects that the distance between the pointing device 100 and a supporting surface is more than $h_0$, the pointing device 100 may enter 3D operational mode. If the proximity sensor associated with the pointing device later detects that the pointing device comes within the distance of $h_0$ above the table top, the pointing device can return to 2D operational mode. The switching between 2D operational mode and 3D operational mode may also be qualified by using the IME 310 to determine the speed, tilt, etc. of the pointing device 100 such that the pointing device can be configured to only enter 2D operational mode if, for example, a bottom surface of the pointing device 100 is relatively horizontal.

Another action to switch the pointing device 100 between 2D operational mode and 3D operational mode involves the use of a mode switching apparatus 108. In embodiments, pressing the mode switching apparatus 108 toggles between 2D operational mode and 3D operational mode. In other embodiments, pressing and holding the mode switching apparatus 108 can switch the pointing device 100 into 3D operational mode and the pointing device can stay in 3D operational mode until the mode switching apparatus 108 is released.

In embodiments, combinations of actions may be used to change modes of the pointing device 100. For example, the pointing device 100 may be configured so that it switches to 3D operational mode only when a user lifts the pointing device 100 greater than $h_0$ above a horizontal surface such as a table top or mouse pad and also depresses the mode switching apparatus 108.

Figure 6:
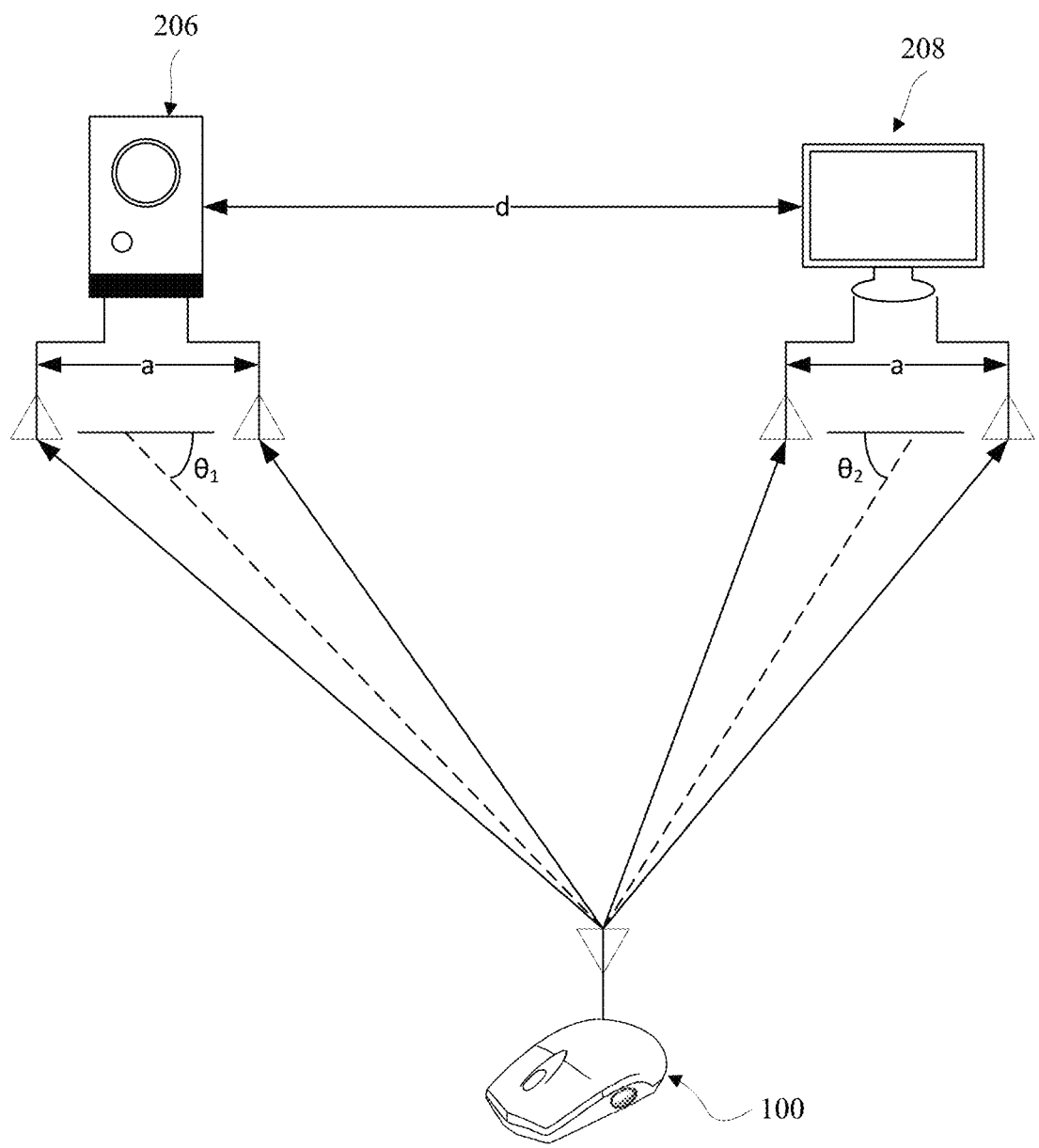
FIG. 6 illustrates the use of wireless protocols to determine a direction of a computing device from a pointing device, according to an embodiment.

FIG. 6 illustrates the use of wireless protocols to determine a direction of a computing device from a pointing device according to an embodiment. Once the pointing device 100 enters the 3D operational mode, the pointing mode may obtain direction and distance information from its internal communications modules, such as UWB module 316, that provides location information when communicating with other computing devices of the system 200 that also have UWB receivers. The UWB module 316 on the pointing device 100 includes a MIMO transceiver with multiple transmit and receive antennas. A speaker 206 and a television 208 also include UWB modules that include a MIMO transceiver with multiple transmit and receive antennas. The use of multiple transmit and receive antennas can allow the reception of measurement parameters such as RSS, ToF, AoA, ToA, TDoA, etc. that can provide information relating to a direction and a distance between the pointing device 100 and the speaker 206, and between the pointing device 100 and the television 208, for example. For example, the speaker or the television may transmit location information back to the pointing device over the communications network 212. When the pointing device 100 is pointed at one of the speaker 206 or the television 208, the MIMO transmit antennas can be pointed more directly towards that device (e.g. the speaker or the television) and which can result in a stronger received signal at the speaker or the television. In this way, the system 200 may determine which computing device of the system 200 is being pointed at by the pointing device 100. The pointing device 100 may use other communications modules instead of the UWB module 316 or in addition to the UWB module 316 to produce similar results. The pointing device 100 may also use the IMU sensor 310 to obtain orientation or rotation information to determine which computing device is being pointed to by the pointing device 100.

Figure 7A:
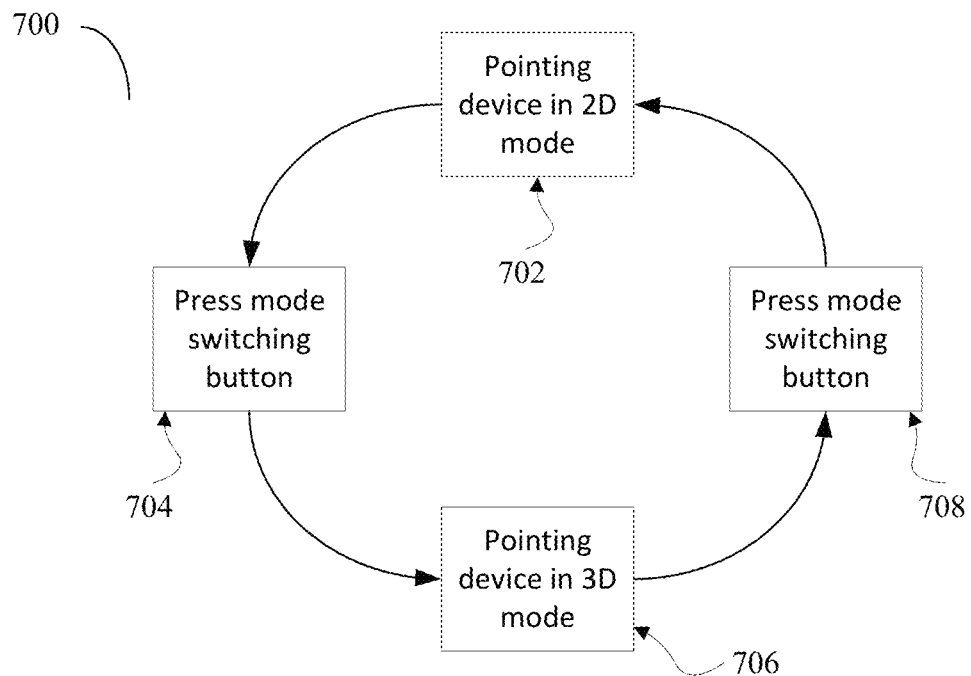
FIG. 7A illustrates a method of toggling the operational mode of a pointing device according to an embodiment.

FIG. 7A illustrates a method 700 of toggling the operational mode of a pointing device between a 2D operational mode and a 3D operational mode according to an embodiment. Initially the pointing device 100 is in a 2D operational mode 702 or in a 3D operational mode 706. When in the 2D operational mode, a user activates 704 the mode switching apparatus 108 which causes the pointing device 100 to enter the 3D operational mode 706. When in 3D operational mode, a user activates 708 the mode switching apparatus 108 which causes the pointing device 100 to enter 2D operational mode 702.

Figure 7B:
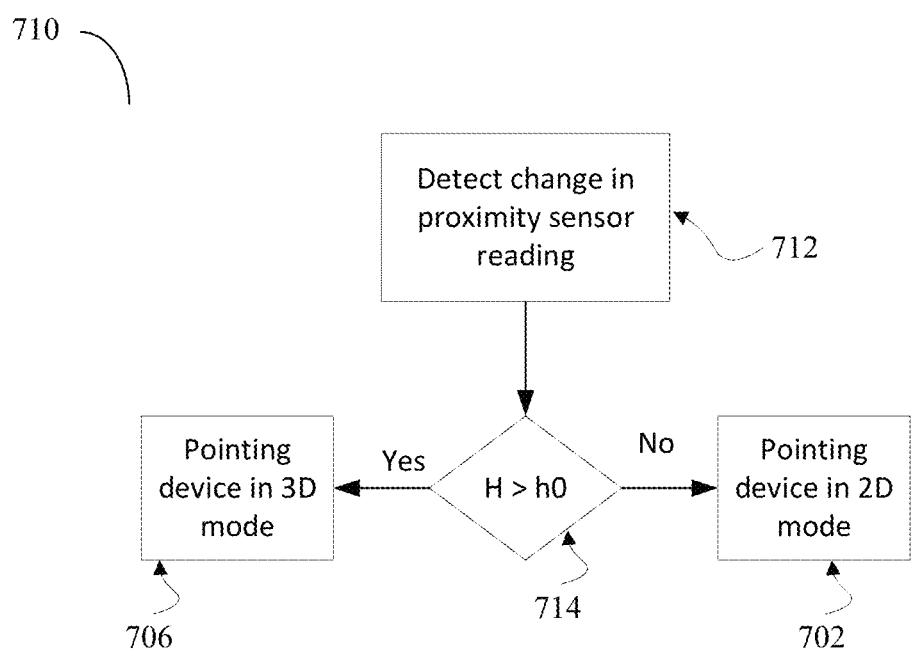
FIG. 7B illustrates a method of changing the operational mode of a pointing device according to an embodiment.

FIG. 7B illustrates a method of changing the operational mode of a pointing device according to an embodiment. When in either 2D operational mode or 3D operational mode, the pointing device 100 detects a change in the proximity sensor reading 712 that indicates the distance, H, from the pointing device 100 to a supporting surface such as a table top. The height can be compared to a predetermined threshold $h_0$ 714. If the height H is greater that $h_0$, the pointing device enters 3D operational mode or remains in 3D operational mode. If the height H is less than or equal to $h_0$, the pointing device enters 2D operational mode or remains in 2D operational mode. When entering 2D operational mode, location information for the computing devices in the vicinity may be used to determine which computing device may then be controlled by the pointing device 100 while in 2D operational mode.

Figure 8:
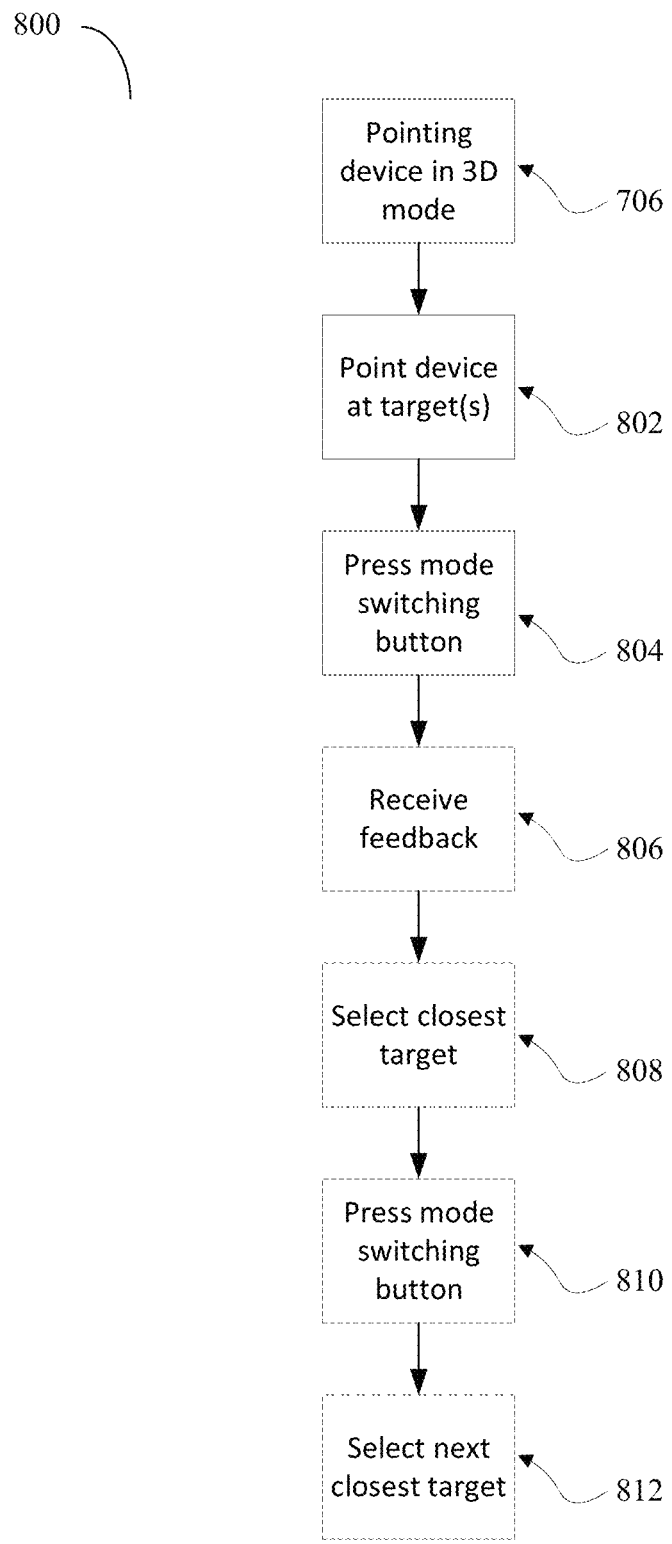
FIG. 8 illustrates a method of using a pointing device to select a computing device according to an embodiment.

FIG. 8 illustrates a method of using a pointing device to select a computing device according to an embodiment. The pointing device 100 may be used to control any of the computing devices connected by the communications network 212 of the system 200. Initially, the pointing device 100 is in 3D operational mode 706 or enters 3D operational mode using the methods described herein or other methods. A user will point or aim the pointing device 100 towards a computing device though if multiple devices are located close to each other, pointing at one computing device may be interpreted as pointing at several computing devices. Alternatively, steps 706 and 802 may be interchanged where the pointing device 100 is first pointed at a desired computing device and then put into 3D operational mode. In embodiments, the mode switching apparatus 108 may be activated in step 804 to confirm that the user desires to select a computing device for control. A pointing algorithm may be used such as ray casting based on the location information and pointing direction of the pointing device 100 and the computing devices, which selects the devices intersected by a virtual beam originating from a front pointing direction of the pointing device 100. In step 806, the newly selected computing device may provide a visual or audio feedback after being selected. The pointing device 100 may also produce a visual, audio, or haptic feedback when a new device is selected. For example, the pointing device may beep, blink an LED indicator, vibrate or other action in order to indicate a new device is selected. If the ray casting algorithm indicates multiple computing devices which may be located one behind the other or closely adjacent to each other, the pointing device 100 may be configured to select the closest computing device in step 808. Alternatively, the pointing device 100 may be configured so that each time mode switching apparatus 108 is pressed at step 810, the next computing device in line will be selected at step 812 until the desired device has been selected.

Figure 9:
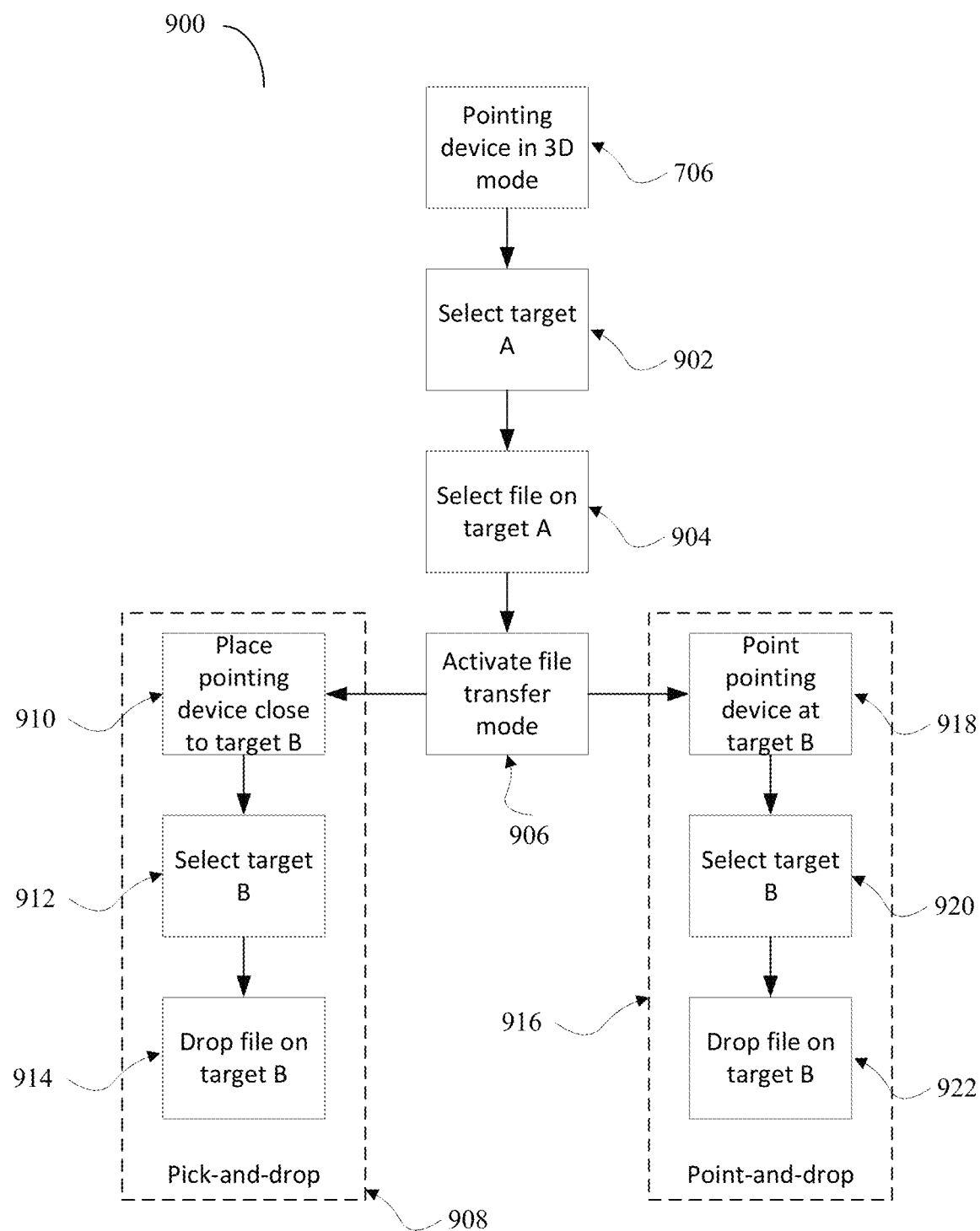
FIG. 9 illustrates methods of using a pointing device to copy files between computing devices according to an embodiment.

FIG. 9 illustrates methods of 3D operational mode of using a pointing device to copy files between computing devices according to an embodiment. To start, the pointing device 100 is used to select a file on computing device A. In step 706, the pointing device 100 is in, or is switched to the correct operational mode to control device A. For example, if device A is a laptop computer, the pointing device 100 may be in 2D operational mode and be placed on a supporting surface to select the file by clicking the button 104a or the button 104b. If device A is a television, the pointing device 100 may be in 3D operational mode, and pointed at the television to select the television, and a button can be pressed to select a file. In step 902, the pointing device 100 is used to select device A. In step 904, a computing device file to be moved or copied from device A is selected. Once selected the selected file may be highlighted by the GUI. Note that if the pointing device 100 is already in the 3D operational mode to select device A, step 706 may be skipped. If device A is already selected, then step 902 may be skipped. In step 906, a file transfer mode is activated. This may be done by selecting a file on device A and activating the mode switching apparatus 108 for a period of time longer than a configured threshold time. It may also be done by activating the mode switching button 108 while also activating or holding another control of the pointing device 100. The file transfer mode may also be activated by making a pre-defined gesture using the pointing device 100. The file transfer mode may also be activated automatically in response to successfully selecting a file on device A.

In embodiments, once the file transfer mode has been entered, the file transfer mode may be cancelled by exiting file transfer mode using methods similar to those used to enter the file transfer mode. In some cases, the same method may be used, in which case the method toggles between the file transfer mode and the non-file transfer mode. When exiting the file transfer mode, a visual feedback or an audio feedback, or a haptic feedback may be used to inform the user.

Embodiments may use a pick-and-drop method 908 or a point-and-drop method 916 to select a target computing device B (target B) and complete the transfer of the file. When using pick-and-drop method 908, target B is selected by placing the pointing device 100 in close physical proximity 910 to target B. While in the file transfer mode, if the distance, D, between pointing device 100 and target B is less than a configured predetermined threshold, H, target B enters receiver mode 912. When in the file receiver mode, a preview image of the file or an icon representing the file to be transferred may be displayed on target B. In the case of a data file, this may include displaying a preview of the contents of the file. In the case of a video or image file, a representative video clip may be played on a display of target B. In the case of an audio file, a representative audio clip may be played on a display of target B.

The pointing device 100 may then be used to "drop" file 914 by the user performing an action such as double-clicking the mode switching apparatus 108, making a gesture or movement with the pointing device 100, or some other configured action while target B is in receiver mode. The action of dropping the file causes the initiation of the copying of the file from device A to target B. In some cases, a file may be dropped on multiple target devices (target computing devices) with one pick-and-drop action. If the relative distances between the target devices and the pointing device 100 are less than H, the user can transfer the file to multiple devices by performing a preconfigured action such as double-clicking the mode switching apparatus 108 once. It will be readily understood that the value of H can be a computing system defined parameter and may be based on operational characteristics of system components.

Depending on the target device and how the target device is configured, dropped files may automatically perform an action such as opening, playing, displaying, etc. For example, an audio file dropped on the speaker 206 may automatically start to play. A video file dropped on the tablet 204 or the television 208 may automatically start to play. A spreadsheet dropped on the computer 202 may automatically be opened. The system 200 and the individual computing device may be configured to perform automatic actions on dropped files or require the user to confirm the action in advance. The system 200 may also be configured so that a computing device only accepts types of files compatible with the computing device. For example, the speaker 206 may only accept audio files, the television 208 may only accept image, video, or audio files. The smartphone 210 may accept a variety of file types. Similar limits may also be placed on the size of received files and checks may be made such that target B may be able to store an entire file or just a portion of a file. In some cases, target B may only be able to accept a file if it is streamed rather than copied.

As part of the action of dropping the file, a check may be performed to ensure that target B is able to accept or process the file. The check may be performed when the file is selected, when the transfer is initiated, or before the transfer is completed. If target B is unable to process the file, the transfer may not be initiated, be interrupted, or cancelled, etc. depending on the configuration of the pointing device and the system.

When using a point-and-drop method 916, target B is selected by "pointing" the pointing device 100 at target B 918 and using the location information provided by the communications modules such as the UWB module 316, as illustrated in FIG. 6 and described above. Once selected 920, target B enters the file transfer mode, and the file may be "dropped" on target B in a similar manner to the pick-and-drop method 908. If the computing devices are placed in close proximity to each other or are in line with each other so that there is ambiguity as to which computing device is to be selected then a single target device may be selected using methods described herein such as by repeatedly activating the mode switching apparatus 108 to toggle or rotate between the possible target devices. As each possible target device is selected, a preview of the file may be indicated on the target device to provide feedback to the user as to which device is presently selected as the target device. When rotating between multiple, possible target devices, a computing device may be omitted if it is incapable of utilizing the file. For example, the speaker 206 would not be selected to receive a data file even if pointed at. The tablet 204 would not be selected if it had insufficient memory to store a large data file. Once target B is selected and in receiver mode, the pointing device 100 may then be used to "drop" the file 922 by the user performing an action such as double-clicking the mode switching apparatus 108, making a gesture or movement with the pointing device 100, or some other configured action while target B is in receiver mode. Similarly to step 914, a compatibility check between the file from target A and target B may be done to ensure that target B is able to receive and process the file.

In embodiments, a haptic actuator may be embedded in the pointing device 100 to provide haptic feedback (e.g. vibrotactile feedback) to a user. For example, during mode switching, a light pulse vibration is generated to inform the user. When picking, pointing, dropping the file, the user may feel a stronger pulse feedback. When switching between target computing devices, the user may receive directional vibrotactile feedback, where the inward direction represents changing to a nearer target device, and the outward direction represents switching to a further target device. The computing devices of the system 200 may also provide visual or audio feedback to indicate that they are pointed to by a pointing device 100, that they are within a distance, H, of the pointing device 100 and may be selected, that they have been selected by pointing device 100, or other interaction events.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a pointing device according to the method of the technology and/or to structure some or all of its components in accordance with the system of the technology.

Through the descriptions of the preceding embodiments may be implemented by using a combination of hardware and software. Based on such understandings, portions of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a pointing device to execute the methods provided in the embodiments.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A pointing device comprising:
a mode switching apparatus that switches the pointing device between a two-dimensional (2D) operational mode and a three-dimensional (3D) operational mode; and
a sensor configured to determine a pointing direction of the pointing device and locations of a plurality of computing devices;
wherein in the 2D operational mode, the pointing device is paired with a first computing device of the plurality of computing devices and controls the first computing device;
wherein in the 3D operational mode, the pointing device is configured to select a second computing device of the plurality of computing devices additionally to control, the selection based on one or more of the pointing direction of the pointing device and the location of the second computing device;
wherein the pointing device is configured to initiate copying of a file from a third computing device to a fourth computing device via a communication path that avoids the pointing device; and
wherein the copying of the file is performed without physical contact between the pointing device and either of the third computing device and the fourth computing device.

2. The pointing device of claim 1, wherein the mode switching apparatus includes a proximity sensor configured to detect a distance between the pointing device and a supporting surface of the pointing device.

3. The pointing device of claim 2, wherein when the distance is greater than a predetermined threshold, the mode switching apparatus is configured to switch the pointing device to the 3D operational mode or maintain the pointing device in the 3D operational mode.

4. The pointing device of claim 2, wherein when the distance is less than a predetermined threshold, the mode switching apparatus is configured to switch the pointing device to the 2D operational mode or maintain the pointing device in 2D operational mode.

5. The pointing device of claim 2, wherein the mode switching apparatus is configured as a button, a switch, a toggle or a pressure sensor.

6. The pointing device of claim 1, wherein the pointing device is further configured to:
determine a file type of the file;
determine that the file type is compatible with the fourth computing device; and
complete the copying of the file from the third computing device to the fourth computing device.

7. The pointing device of claim 1, wherein the sensor includes an ultra-wideband (UWB) communications module.

8. The pointing device of claim 7, wherein the UWB communications module is configured to receive location information from the plurality of computing devices.

9. The pointing device of claim 8, wherein the location information is indicative of a relative direction and distance between the pointing device and the plurality of computing devices.

10. The pointing device of claim 1, further comprising a haptic actuator configured to provide haptic feedback to a user.

11. A method of controlling a plurality of computing devices, the method comprising:
obtaining, by a sensor of a pointing device, a pointing direction of the pointing device and locations of the plurality of computing devices;
controlling, by the pointing device, a paired computing device of the plurality of computing devices while the pointing device is in a two-dimensional (2D) operational mode;
upon transfer into a three-dimensional (3D) operational mode, additionally selecting, by the pointing device, a target computing device of the plurality of computing devices, the selecting based on an input at least in part received from the sensor; and
copying, by the pointing device, a file from the paired computing device to the target computing device:
via a communication path that avoids the pointing device; and
without physical contact between the pointing device and either of the paired computing device and the target computing device.

12. The method of claim 11, wherein the sensor determines a relative position between the pointing device and the target computing device and the pointing direction of the pointing device.

13. The method of claim 11, wherein the pointing device switches into the 3D operational mode upon determination that a distance between the pointing device and a supporting surface of the pointing device is greater than a predetermined threshold.

14. The method of claim 11, wherein the pointing device switches into the 3D operational mode upon activation of a mode switching control.

15. The method of claim 11, wherein the target computing device is selected upon detection that the pointing device is within a predetermined distance of the target computing device.

16. The method of claim 11, wherein the target computing device is selected upon detection that the pointing device is pointing at the target computing device.

17. The method of claim 16, wherein the pointing device uses a ultrawide band (UWB) communication module to determine the pointing direction of the pointing device.

18. The method of claim 11,
wherein the target computing device is one of two or more computing devices pointed at by the pointing device, the method further comprising:
detecting, by the pointing device, repeated activation of a mode switching apparatus, thereby selecting the target device from the two or more computing devices pointed at by the pointing device.

19. The method of claim 18, further comprising:
determining, by the pointing device, a file type of the file; and
determining, by the pointing device, that the file type is compatible with the target computing device.

20. A non-transitory storage medium storing thereon machine executable instructions, which when executed by a processor cause a pointing device to perform the steps comprising:
obtaining, by a sensor of the pointing device, a pointing direction of the pointing device and locations of a plurality of computing devices;
controlling, by the pointing device, a paired computing device of the plurality of computing devices while the pointing device is in a two-dimensional (2D) operational mode;
upon transfer into a three-dimensional (3D) operational mode, additionally selecting, by the pointing device, a target computing device of the plurality of computing devices, the selecting based on an input at least in part received from a sensor; and
initiate copying, by the pointing device, a file from the paired computing device to the target computing device:
via a communication path that avoids the pointing device; and
without physical contact between the pointing device and either of the paired computing device and the target computing device.

\* \* \* \* \*